(12) United States Patent
Chu

(10) Patent No.: US 8,956,236 B2
(45) Date of Patent: Feb. 17, 2015

(54) UNIVERSAL JOINT STRUCTURE FOR A TOOL

(71) Applicant: Hung-Pin Chu, Taichung (TW)

(72) Inventor: Hung-Pin Chu, Taichung (TW)

( * ) Notice: Subject to any disclaimer, the term of this patent is extended or adjusted under 35 U.S.C. 154(b) by 0 days.

(21) Appl. No.: 13/931,981

(22) Filed: Jun. 30, 2013

(65) Prior Publication Data

US 2015/0005080 A1 Jan. 1, 2015

(51) Int. Cl.
*F16D 3/16* (2006.01)
*F16C 1/04* (2006.01)

(52) U.S. Cl.
CPC ........................ *F16C 1/04* (2013.01)
USPC .......................... 464/159; 81/177.75; 411/517

(58) Field of Classification Search
CPC ....... F16D 3/185; F16D 3/20; B25B 23/0014; B25B 23/0028; B25B 23/0035; F16B 21/18
USPC .......................... 464/106, 153, 155, 158, 159; 81/177.75; 411/517, 521
See application file for complete search history.

(56) References Cited

U.S. PATENT DOCUMENTS

| 3,897,703 | A | * | 8/1975 | Phipps | 81/177.75 |
| 5,433,668 | A | * | 7/1995 | Harz et al. | |
| 5,527,220 | A | * | 6/1996 | Geczy | 464/153 |
| 5,738,586 | A | * | 4/1998 | Arriaga | 464/106 |
| 6,152,826 | A | * | 11/2000 | Profeta et al. | 464/159 |
| 8,096,212 | B2 | * | 1/2012 | Su | 81/177.75 |

FOREIGN PATENT DOCUMENTS

| DE | 663 625 | * | 8/1938 | 464/153 |
| DE | 678 093 | * | 7/1939 | 464/106 |

* cited by examiner

*Primary Examiner* — Gregory Binda

(57) ABSTRACT

A universal joint structure for a tool contains an operating rod, a fitting sleeve, and a retaining member. The operating rod includes a universal joint formed on one end thereof, the universal joint is formed in a polygonal sphere shape, the fitting sleeve includes a polygonal locking groove defined thereon for fitting the universal joint, the fitting sleeve also includes a circular recess arranged adjacent to an opening of the locking groove and retaining with the retaining member. The retaining member is a C-retaining ring and includes a tilted guiding face defined around one surface thereof, and wherein one end of the titled face away from the circular recess is larger than another end of the titled guiding face adjacent to the circular recess so that when the universal joint is fitted into the locking groove, the titled guiding face retains with the universal joint of the operating rod.

4 Claims, 4 Drawing Sheets

UNIVERSAL JOINT STRUCTURE FOR A TOOL

FIELD OF THE INVENTION

The present invention relates to a universal joint structure which fits an operating rod with a fitting sleeve securely and removes the operating rod from the fitting sleeve quickly.

BACKGROUND OF THE INVENTION

A conventional universal joint structure is disclosed in TW Patent No. 209513 and contains a holder with a receiving groove and a spherical fitting knob. The fitting knob is pivoted in the holder which has two opposite holes so that an inserting rod is pivoted with the fitting knob, and a spring is fixed in the receiving groove and has a holding piece in which a dented recess is defined. The dented recess is spherical so as to correspond to the spherical fitting knob, and the spherical fitting knob has an orifice for inserting the inserting rod. However, such a conventional universal joint structure has to drill the hole and the orifice thereon and then to insert the inserting rod therein, thus causing troublesome assembly.

Another conventional universal joint structure is disclosed in TW Patent No. M369830 and contains a connecting sleeve with a hole and a coupling shaft. The coupling shaft has an extension formed on one end thereof and inserted into the hole and has a spherical universal joint formed on another end thereof, and between the extension and the universal joint is defined a neck with an outer diameter which decreases. The universal joint has a plurality locking portions evenly arranged therearound and has a fitting sleeve with a retaining recess for connecting with the universal joint of the coupling shaft; a retainer fixed in the retaining recess so as to retain the universal joint. However, the retainer cannot retain the universal joint securely.

The present invention has arisen to mitigate and/or obviate the afore-described disadvantages.

SUMMARY OF THE INVENTION

The primary object of the present invention is to provide a universal joint structure which fits an operating rod with a fitting sleeve securely and removes the operating rod from the fitting sleeve quickly.

To obtain the above objective, a universal joint structure provided by the present invention contains: an operating rod, a fitting sleeve, and a retaining member.

The operating rod includes a universal joint formed on one end thereof, and the universal joint is formed in a polygonal sphere shape, the fitting sleeve includes a locking groove defined thereon for fitting the universal joint, and the locking groove is polygonal, the fitting sleeve also includes a circular recess arranged adjacent to an opening of the locking groove and retaining with the retaining member.

The retaining member is a C-retaining ring and includes a slanted guiding face defined around one surface thereof, and wherein one end of the slanted face away from the circular recess is larger than another end of the titled guiding face adjacent to the circular recess so that when the universal joint is fitted into the locking groove, the slanted guiding face retains with the universal joint of the operating rod.

Thereby, the operating rod is fitted with the fitting sleeve securely and easily, and the universal joint is disengaged from the locking groove of the fitting sleeve by using the slanted guiding face so as to remove the operating rod from the fitting sleeve quickly.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

With reference to FIGS. 1-5, a universal joint structure for a tool according to a first embodiment of the present invention comprises an operating rod 1, a fitting sleeve 2, and a retaining member 3.

Figure 1:
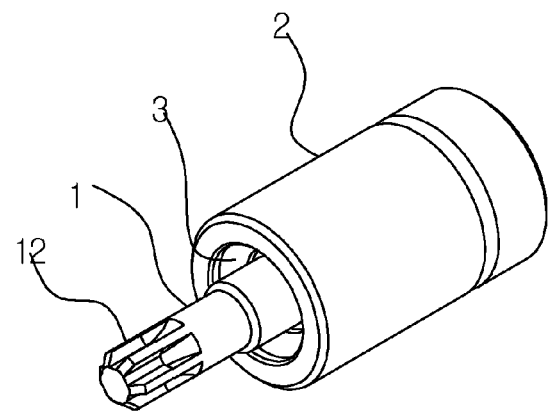
FIG. 1 is a perspective view showing the assembly of a universal joint structure according to a first embodiment of the present invention.
Figure 2:
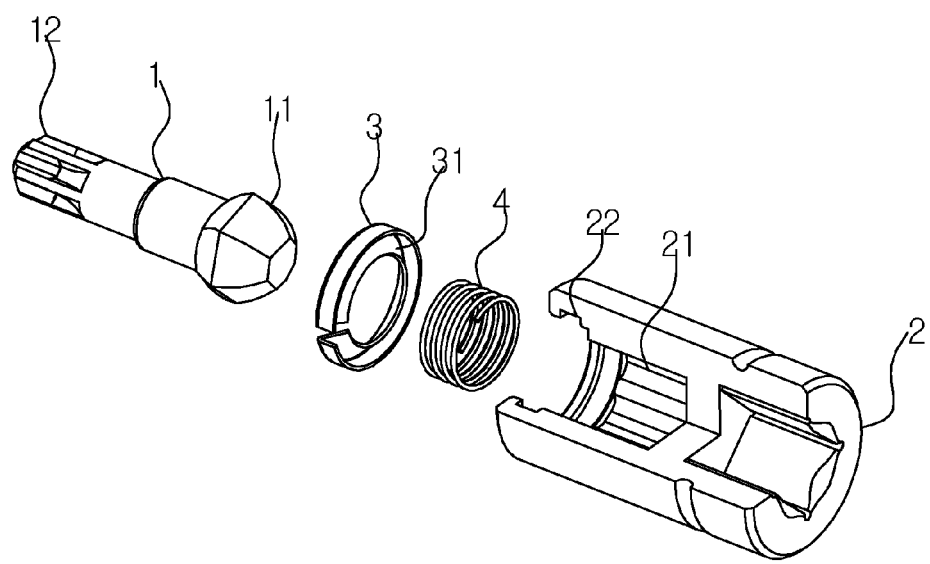
FIG. 2 is a perspective view showing the exploded components of the universal joint structure according to the first embodiment of the present invention.
Figure 3:
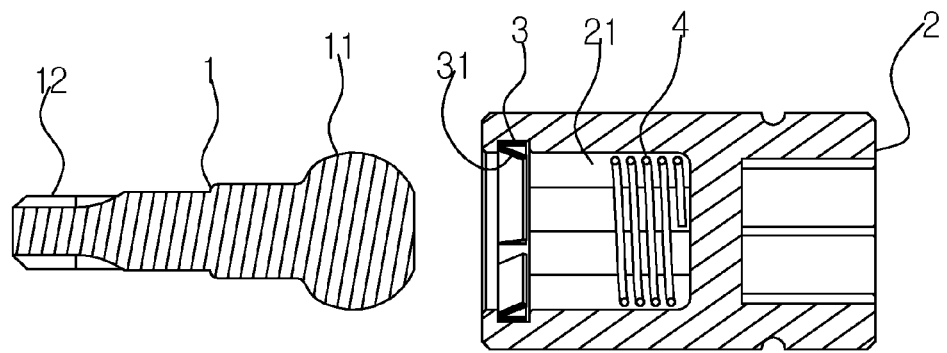
FIG. 3 is a cross sectional view showing the operation of the universal joint structure according to the first embodiment of the present invention.
Figure 4:
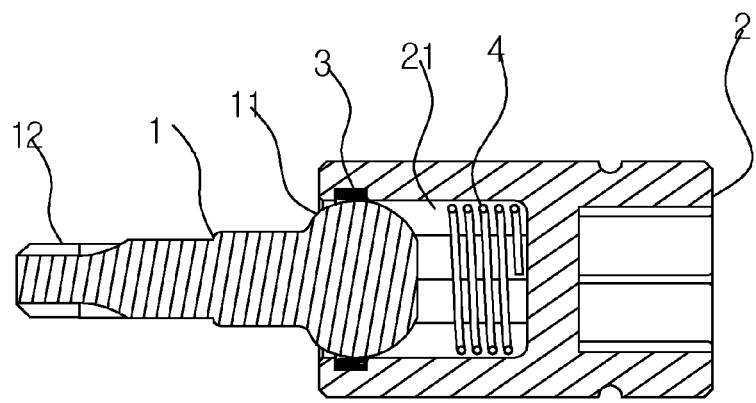
FIG. 4 is another cross sectional view showing the operation of the universal joint structure according to the first embodiment of the present invention.
Figure 5:
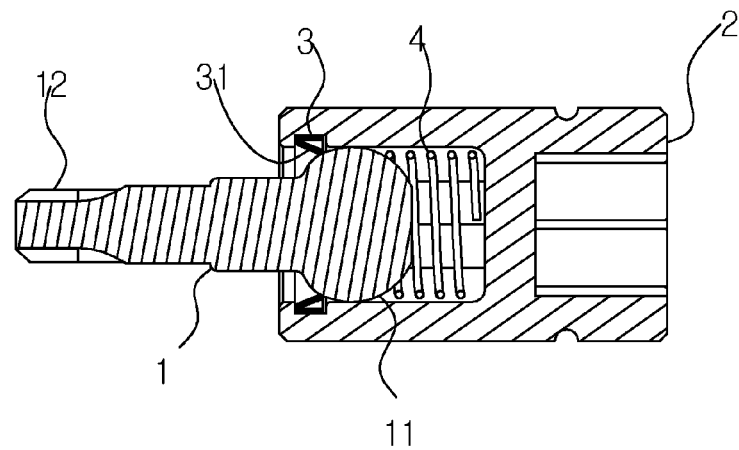
FIG. 5 is also another cross sectional view showing the operation of the universal joint structure according to the first embodiment of the present invention.

The operating rod 1 includes a universal joint 11 formed on one end thereof, and the universal joint 11 is formed in a polygonal sphere shape (as shown in FIG. 2, the universal joint 11 is a spherical knob with a polygonal outer surface), the fitting sleeve 2 includes a locking groove 21 defined thereon for fitting the universal joint 11, and the locking groove 21 is polygonal, the fitting sleeve 2 also includes a circular recess 22 arranged adjacent to an opening of the locking groove 21 and retaining with the retaining member 3.

The retaining member is a C-retaining ring and includes a slanted guiding face 31 defined around one surface thereof, and wherein one end of the slanted face 31 away from the circular recess 22 is larger than another end of the slanted guiding face 31 adjacent to the circular recess 22 so that when the universal joint 11 is fitted into the locking groove 21, the slanted guiding face 31 retains the universal joint 11 of the operating rod 1, and the slanted guiding face 31 is also used to facilitate a disengagement of the universal joint 11 from the locking groove 21.

Thereby, in the assembly, the retaining member 3 is placed into the circular recess 22, and the universal joint 11 of the operating rod 1 is fitted into the locking groove 21 so that the slanted guiding face 31 engages with the universal joint 11, thus fitting the operating rod 1 with the fitting sleeve 2 securely and easily.

The locking groove 21 of the fitting sleeve 2 has a spring 4 mounted therein and abutting against the universal joint 11 so that when the operating rod 11 is rotated at a predetermined angle, the spring 4 generates a pre-stressed positioning so as to facilitate an operation of the universal joint structure.

In the first embodiment, as illustrated in FIG. 1-5, the operating rod 1 includes a screwdriver bit 12 formed on one end thereof opposite to the universal joint 11.

Figure 6:
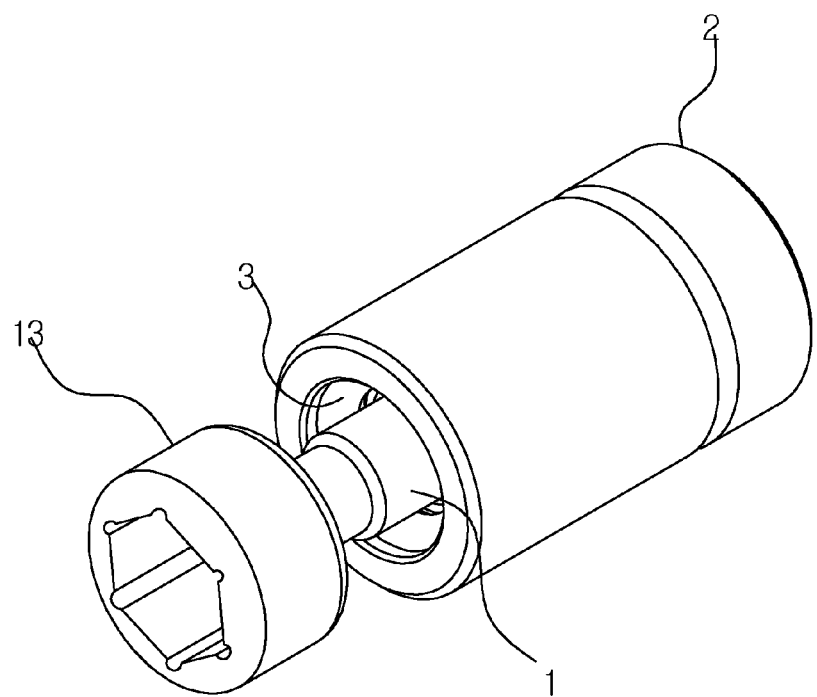
FIG. 6 is a perspective view showing the assembly of a universal joint structure according to a second embodiment of the present invention.
Figure 7:
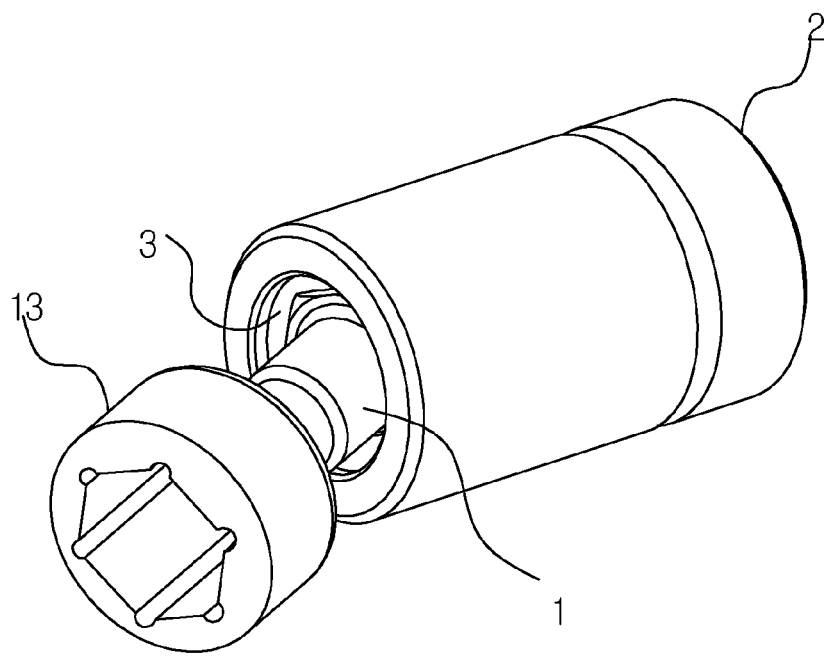
FIG. 7 is another perspective view showing the assembly of a universal joint structure according to a second embodiment of the present invention

Referring further to FIGS. 6 and 7, a universal joint structure according to a second embodiment of the present invention, the operating rod 1 includes a socket joint 13 formed on one end thereof opposite to the universal joint 11.

Thereby, the operating rod 1 is fitted with the fitting sleeve 2 securely and easily, and the universal joint 11 is disengaged form the locking groove 21 of the fitting sleeve 2 by using the slanted guiding face 31 so as to remove the operating rod 1 from the fitting sleeve 2 quickly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A universal joint structure for a tool comprising: an operating rod, a fitting sleeve, and a retaining member; wherein:

the operating rod includes a universal joint formed on an end thereof, and the universal joint is formed in a polygonal spherical shape, the fitting sleeve includes a locking groove defined thereon for accepting the universal joint, and the locking groove has a polygonal surface, the fitting sleeve further includes a circular groove disposed on an internal surface of the fitting sleeve adjacent to an opening of the locking groove and retaining the retaining member; and the retaining member is a C-retaining ring and includes a slanted guiding face extending away from another surface of the C-retaining ring disposed and retained within the circular groove, the slanted guiding face retaining the universal joint of the operating rod.

2. The universal joint structure for a tool as claimed in claim 1, wherein the locking groove of the fitting sleeve has a spring mounted therein and abutting against the universal joint.

3. The universal joint structure for a tool as claimed in claim 1, wherein the operating rod includes a driver bit formed on an end thereof opposite to the universal joint.

4. The universal joint structure for a tool as claimed in claim 1, wherein the operating rod includes a socket joint formed on an end thereof opposite to the universal joint.

* * * * *